Feb. 10, 1942.    W. C. KEERAN    2,272,526
SEAL FOR ROTATING SHAFTS
Filed Feb. 28, 1941
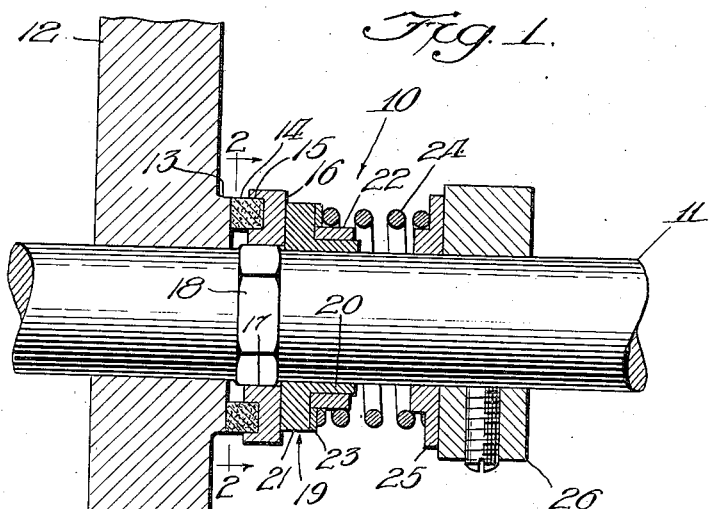
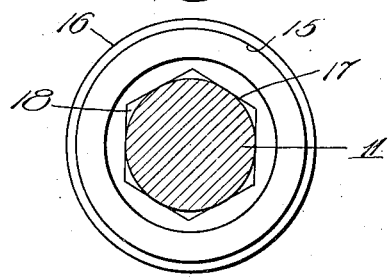
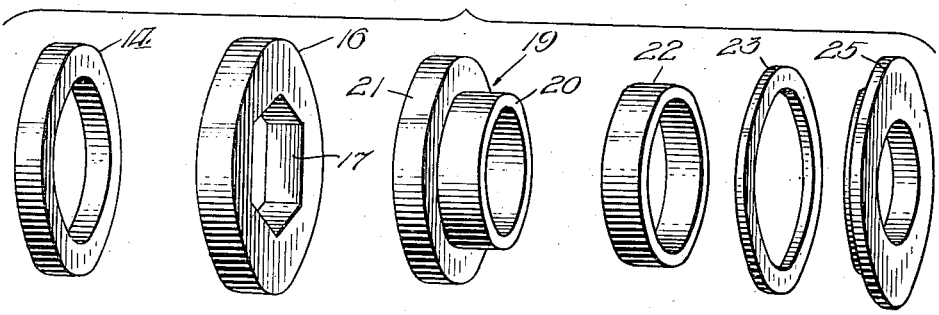
Inventor:
William C. Keeran
By Davis, Lindsey, Smith & Shonts
Attys Patented Feb. 10, 1942

2,272,526

UNITED STATES PATENT OFFICE 2,272,526

SEAL FOR ROTATING SHAFTS

William C. Keeran, Evanston, Ill., assignor to Bell & Gossett Company, Chicago, Ill., a corporation of Illinois Application February 28, 1941, Serial No. 381,025

2 Claims. (Cl. 286—11)

My invention relates to seals for rotating shafts and is more particularly concerned with preventing leakage of fluid along the shaft and beyond a wall through which the shaft extends.

One object of my invention is to provide a seal in which leakage along the shaft and across the face of the wall transverse of the shaft is inhibited, respectively, by a resilient packing element and an annular sealing ring which are mounted on and individually driven by the shaft.

A further object is to provide a seal of the foregoing character in which the sealing ring is resiliently maintained in sealing contact with the wall, and the packing element is resiliently maintained in contact with the ring.

A further object is to devise a seal as indicated wherein the element which seals the surface of the shaft is made of rubber, synthetic or natural, and in which provision is made for swelling of the element when exposed to hot fluids without danger of binding any part of the seal.

These and further objects of my invention will be set forth in the following specification, reference being had to the accompanying drawing, and the novel means by which said objects are effectuated will be definitely pointed out in the claims.

In the drawing:

Fig. 1 is a sectional elevation of my improved seal, showing the same in operative relation to a rotating shaft and a wall through which the shaft extends.

Fig. 2 is a section along the line 2—2 in Fig. 1, showing the driving connection between the shaft and one of the sealing elements of the structure.

Fig. 3 is a dispersed assembly showing in perspective the principal elements of my improved seal.

Referring to the drawing, the numeral 10 designates my improved seal which is mounted on a shaft 11 to prevent leakage of fluid along the surface of the shaft and also in leakage-inhibiting relation to a wall member 12 through which the shaft extends. It will be understood that the shaft may be journalled in the wall 12, as shown, or it may extend through the wall in clearance relation thereto without affecting the scope of the present invention.

The surface of the wall 12 adjacent the seal is preferably provided with a boss 13 that is coaxial with the shaft 11 and which is finished to provide a smooth bearing surface against which the ring 14 rides with a sealing contact. It is contemplated that instead of employing the boss 13, the same result can be obtained by bushing the opening in the wall 12 through which the shaft 11 extends and providing an annular flange on the right end of this bushing against which the sealing ring 14 rides. The ring 14 may be made of any high grade bearing metal that is capable of being machined to provide an antifriction and leak-proof surface when pressed against the boss 13, but, preferably, the ring 14 is made of carbon, since this material is relatively inexpensive, wears smoothly in use, and will always prevent leakage when held against the surface of the boss 13 with sufficient pressure.

The ring 14 may be mounted in an annular groove 15 provided in a holder 16 that is coaxially provided with a non-circular opening 17, in this case shown as being hexagonal in shape, which fits a similarly shaped portion 18 formed on the shaft 11 so as to effect a rotation of the holder with the shaft, while permitting the holder to move axially of the shaft, as the sealing ring 14 wears.

Leakage along the surface of the shaft is prevented by means of a resilient packing element 19 that is preferably composed of any of the well-known synthetic rubbers, such as "Duprene," or "Neoprene." The element 19 comprises a sleeve portion 20 that frictionally grips the surface of the shaft 11 with sufficient firmness to cause the sleeve 20 to rotate with the shaft 11 and it also includes an annular flange portion 21 that sealably bears against one side of the holder 16. The sleeve 20 is strengthened transversely of the shaft by a retaining ring 22 that closely encircles the sleeve and assists in maintaining the snug relation of the sleeve to the shaft.

A pressure ring 23 encircles the retaining ring 22 and is held against the flange portion 21 by means of a helical spring that encircles the shaft 11, the opposite end of the spring abutting against a ring 25 that is held against axial movement by means of a collar 26 that is secured to the shaft in any approved manner. This spring accordingly provides the required sealing pressure between the face of the boss 13 and the sealing ring 14, and also between the coacting faces of the flange 21 and holder ring 16. As before stated, leakage along the shaft is prevented by reason of the sealing contact of the sleeve 20 with the surface of the shaft. The collar 26 is intended to exemplify any type of abutment on the shaft.

When assembled on the shaft, the resilient packing element 19 is placed in the position approximately as shown in Fig. 1 and remains in this position throughout the life of the seal. As the sealing ring 14 wears, the spring 24, acting through the flange 21, gradually moves the holder ring 16 toward the left until the sealing ring 14 has been completely worn. This axial movement of the holder 16 is permitted by the flexibility inherent in the flange 21.

It will be noted in particular that each of the sealing members of my improved seal, namely, the sealing ring 14 and the resilient packing element 19, are separately driven from the shaft 11. In other words, this construction constitutes an improvement over seals of a similar character wherein it is necessary to establish sufficient frictional contact between the flange 21 and the holder 16 in order to insure that the latter will rotate with the shaft. Such a construction, however, places an undue burden on the packing element 19. This objection has been entirely eliminated in my improved construction so that the element 19 is only called upon to fulfill its primary function, i. e., sealing. Moreover, with such a relation of the parts, it is possible to materially increase the useful life of the seal.

When seals of this character are used under conditions of high temperature, such as, for example, in the circulating pump of a hot water heating system, it has been ascertained that the material composing the packing element 19 is prone to swell. In prior art constructions, it has been the practice to encase the periphery of the element 19 with a sleeve of some character, so that a material restraint is placed upon the swelling tendency of the element. In some instances, this restraint has been sufficient to cause a binding of the parts of the seal with consequent damage thereto.

In my improved construction, however, the periphery of the flange 21 is completely exposed, so that the packing element can freely expand in radial directions and thus accommodate itself to conditions of high temperature without causing any damage to the seal.

I claim:

1. A seal for a wall and a shaft extending therethrough having a non-circular, coaxial portion integrally formed thereon comprising a rigid holder having an annular seal receiving socket and an axial opening for fitting the shaft portion to provide a direct driving engagement therewith, the holder being axially shiftable on the portion, a sealing annulus mounted in the socket, resilient sealing means having a portion frictionally engaging the shaft to provide a driving grip and sealing contact therewith and another portion for sealably contacting the holder, and means for maintaining the sealing contact of the holder and last named portion.

2. A seal for a wall and a shaft extending therethrough having a non-circular, coaxial portion integrally formed thereon comprising a rigid holder having an annular seal receiving socket and an axial opening therethrough for fitting the shaft portion to provide a driving engagement therewith, the holder being axially shiftable on the portion, a sealing annulus mounted in the socket, resilient sealing means frictionally gripping the shaft for driving and sealing engagement therewith and having an annular, flexible flange for contacting the holder, and means for maintaining sealing contact of the holder and flange, the periphery of the flange being exposed and unconfined to permit radial swelling when exposed to high temperatures.

WILLIAM C. KEERAN.